Nov. 1, 1938.  J. H. BLANKENBUEHLER ET AL.  2,135,045
CONTROL FOR WELDING GENERATORS
Filed May 4, 1934
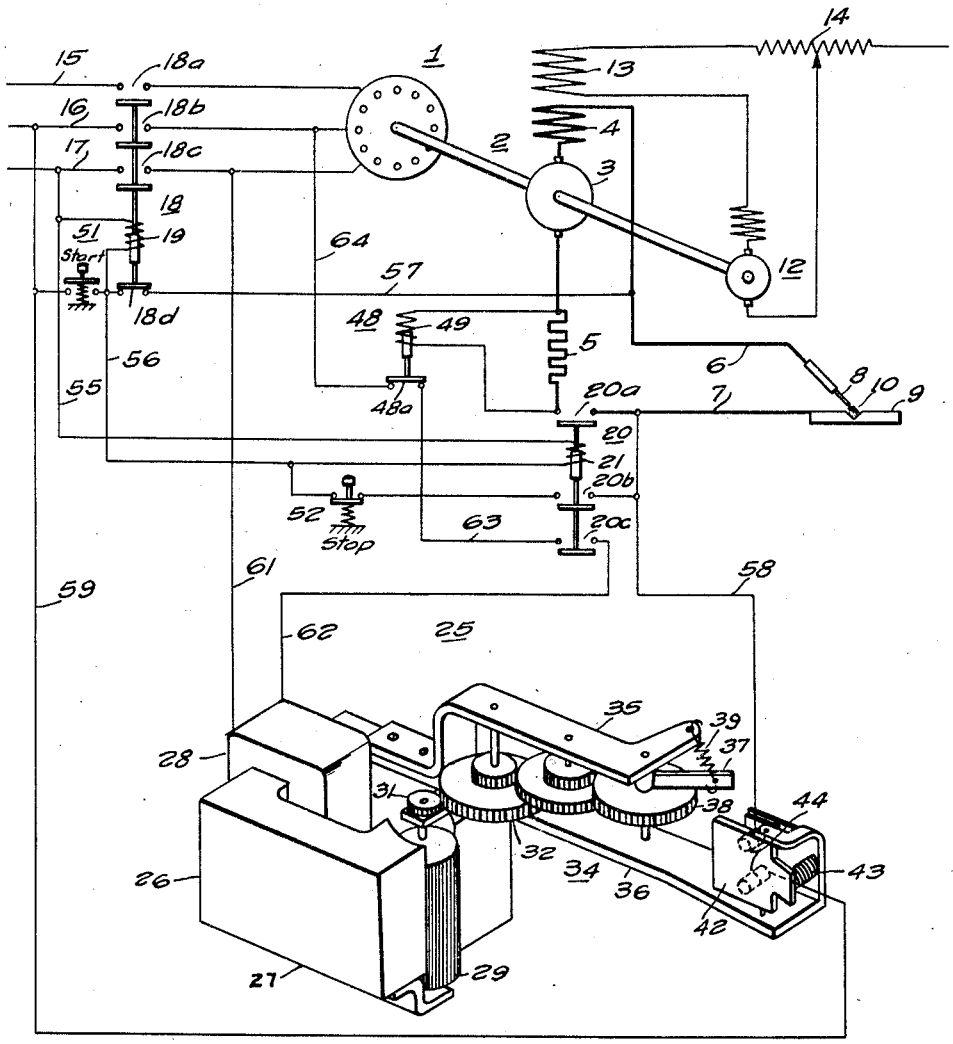
WITNESSES:
E. A. M°Closkey
R R Lockwood
INVENTORS
John H. Blankenbuehler
and Irvine J. Rees.
BY
G. M. Crawford
ATTORNEY Patented Nov. 1, 1938

2,135,045

UNITED STATES PATENT OFFICE 2,135,045

CONTROL FOR WELDING GENERATORS

John H. Blankenbuehler, Edgewood, and Irvine J. Rees, Turtle Creek, Pa., assignors to Westinghouse Electric & Manufacturing Company, East Pittsburgh, Pa., a corporation of Pennsylvania Application May 4, 1934, Serial No. 723,878

12 Claims. (Cl. 171—118)

Our invention relates, generally, to electrical control systems and it has particular relation to control systems for motor-generator arc welding sets.

The object of our invention, generally stated, is to provide a control system for motor-generator arc welding sets which shall be simple and efficient in operation and which may be readily and economically manufactured and installed.

The principal object of our invention is to provide for disconnecting the driving motor of a motor-generator set, disposed to supply current to a welding circuit, from a power source, a predetermined interval of time after welding current ceases to flow.

Another important object of our invention is to provide for connecting the driving motor of a motor-generator set, disposed to supply current to a welding circuit, to a power circuit in response to the establishment of the welding circuit.

A further object of our invention is to provide for automatically resetting a time delay device, which is initiated into operation on cessation of flow of welding current, provided that the welding current is caused to flow within the predetermined time interval for which the device is set.

Other objects of our invention will in part be obvious and in part appear hereinafter.

Our invention accordingly is disclosed in the embodiment thereof shown in the accompanying drawing and comprises the features of construction, combination of elements, and arrangement of parts which will be exemplified in the construction hereinafter set forth and the scope of the application of which will be indicated in the appended claims.

For a more complete understanding of the nature and scope of our invention, reference may be had to the following detailed description taken in connection with the accompanying drawing, in which the single figure diagrammatically represents a control system organized in accordance with our invention.

In order to provide for automatically disconnecting the motor of a motor generator arc welding set from the power source, contact members are utilized which are connected in series circuit relation with the operating winding of the main switch which is used to connect the motor to the power source. A current responsive relay is provided for initiating the operation of a time delay device so that, on cessation of current flow in the welding circuit, the time delay device is operated to open the contact members after the expiration of a predetermined time interval. The operating winding of the main switch is thereupon deenergized and the set is disconnected from the power source.

In the event that current is caused to flow in the welding circuit before the expiration of the predetermined interval of time, the time delay device will automatically reset.

The opening of the main switch is accompanied by the opening of the welding circuit. This circuit is opened in order to permit the main switch to be closed by the engagement of the welding electrode with the work.

Referring now particularly to the single figure of the drawing, the reference character 1 designates generally a three-phase squirrel-cage alternating current motor which is arranged to drive a welding generator, shown generally at 2. The welding generator 2 comprises an armature 3 and a differential series field winding 4 which are connected through a resistor 5 to supply current to a welding circuit comprising the conductors 6 and 7. As illustrated, the conductors 6 and 7 are connected, respectively, to the welding electrode 8 and work 9 between which a welding arc 10 is maintained for performing the welding operation. An exciter generator, shown generally at 12, is provided for energizing a main field winding 13 located on the generator 2. An adjustable resistor 14 is provided in series circuit relation with the main field winding 13 for regulating the flow of current therethrough to adjust the output of the generator 2 to the desired value.

The motor 1 may be connected to a suitable source of three-phase current which may be indicated by the energized conductors 15, 16 and 17. A motor main switch, shown generally at 18 and having operating winding 19, is provided for connecting the motor 1 at contact members 18a, 18b and 18c to the conductors 15, 16 and 17, respectively. It will be understood that other types of motors may be used instead of the motor 1 illustrated and described herein and also that other types of welding generators 2 may be employed. The motor generator set illustrated and described herein is used for illustrative purposes only.

At the same time that the motor main switch 18 is energized, a generator main switch, shown generally at 20 having an operating winding 21, is also energized to connect at contact members 20a the generator 2 to the welding circuit comprising the conductors 6 and 7. The generator main switch 20 is provided in order to disconnect the welding circuit from the generator 2 in order to permit a desired control function which will be set forth hereinafter and which would not be possible if the generator 2 were not disconnected from the welding circuit. While a separate operating winding 21 is shown for operating the generator main switch 20, it will be understood that all of the contact members operated thereby may be also operated by the motor main switch 18 if desired. However, in order to more clearly illustrate the invention the switches 18 and 19 are shown separately but with their operating windings 19 and 21 connected in parallel circuit relation so that the switches 18 and 20 will be operated simultaneously.

In order to effect the deenergization of the operating winding 19 of the motor main switch at the expiration of a predetermined time interval after current ceases to flow in the welding circuit, a time delay device, shown generally at 25, is provided. It comprises a motor, shown generally at 26, having a field structure 27 and a field winding 28. A rotor 29 is rotatably and slidably mounted between the pole pieces of the field structure in a manner such that when the field winding 28 is deenergized, the rotor 29 is dropped out of alignment with the field structure 27 to the position illustrated in the drawing. On energization of the field winding 28, the rotor 29 not only is caused to revolve but is also caused to move upwardly to assume a position of minimum reluctance.

Advantage is taken of the movement of the rotor 29 to cause a pinion 31 driven thereby to engage a gear wheel 32 forming a part of a gear train, shown generally at 34. The gear train 34 is mounted, as illustrated, between brackets 35 and 36 which may be secured to the field structure 27. An operating arm 37 is secured to the last gear wheel 38 of the gear train 34 and is rotatable therewith. A spring 39, secured to the operating arm 37 and the upper bracket 35, is provided for retrieving the operating arm 37 when the winding 28 is deenergized and the pinion 31 is moved out of engagement with gear wheel 32.

As shown in the drawing, the operating arm 37 is arranged to engage a bridging contact member 42 which is pivotally mounted on an extension of the lower bracket 36. The bridging member 42 is biased by means of a spring 43 into engagement with contact members 44 so that they are normally closed thereby.

When the field winding 28 is energized, the rotor 29 is moved upwardly and rotated as set forth hereinbefore to cause the pinion 31 to engage and rotate the gear wheel 32 and the remaining gears of the gear train 34. The operating arm 37 is moved until it engages the bridging contact member 42 and moves it out of engagement with the contact members 44. The bridging contact member 42 is so arranged that it will cause the motor 29 to stall so long as the field winding 28 remains energized. The motor 26 is so constructed that such operation thereof is permissible due to the relatively high impedance of the field winding 28, which is not appreciably altered when the rotor 29 is permitted to revolve.

The operation of the time delay device 25 is controlled by means of a current-responsive relay, shown generally at 48, having an operating winding 49 connected in shunt circuit relation with the resistor 5 in the welding circuit. It will be understood that the operating winding 49 may be inserted directly in the circuit to the generator 2 if it is desired to conduct the total welding current through it.

In the event that it is desired to manually control the operation of the motor 10, start and stop push buttons 51 and 52, respectively, are provided. The former is arranged to directly connect the operating winding 19 of the motor main switch 18 and the operating winding 21 of the generator main switch 20 to the energized conductors 16 and 17 while the latter is arranged to open the energizing circuit thereto.

In operation, it will be assumed that the conductors 15, 16 and 17 are energized, that the welding operation is not being performed and that the motor main switch 18 is in the position shown in the drawing. Under these conditions, the generator main switch 20 will also be in the position shown in the drawing, the operating winding 49 of relay 48 will be deenergized and the time delay device 25 will also be in the position illustrated in the drawing. In order to initiate the operation of the motor 1, the operator contacts the welding electrode 8 with the work 9 to complete a circuit for energizing the operating windings 19 and 21 of the switches 18 and 20, respectively.

The circuit for energizing operating windings 19 and 21 may be traced from the energized conductor 17 through conductor 55, operating windings 19 and 21 in parallel, conductor 56, contact members 18d of the switch 18 which are closed, conductors 57 and 6, the welding electrode 8 and work 9, conductors 7 and 58, contact members 44 which are closed and conductor 59 to the energized conductor 16.

As soon as the main switch 18 is closed, contact members 18d are opened to disconnect the energizing circuit of the operating windings 19 and 21 from the welding circuit. The energizing circuit for these windings, however, is completed by the closure of contact members 20b on the switch 20 so that the energizing circuit for the operating windings 19 and 21 will be maintained closed. It will be understood that the contact members 20b may be adjusted to be bridged just prior to the time when the contact members 18d are opened.

The closure of the generator main switch 20 also closes contact members 20c and the field winding 28 of the motor 26 is energized. As soon as welding current starts to flow, however, the operating winding 49 of the current responsive relay 48 is energized to open at contact members 48a the circuit for energizing the winding 28. As a result the operating arm 37 is retrieved by the spring 39 to its initial position.

The circuit for energizing the field winding 28 may be traced from the energized conductor 17 through conductor 61, field winding 28, conductor 62, contact members 20c, conductor 63, contact members 48a and conductor 64 to the energized conductor 16.

When welding current ceases to flow in the welding circuit, as for instance when the welding operation is terminated, the operating winding 49 of the current responsive relay 48 is no longer energized and contact members 48a are bridged. The winding 28 of the motor 26 is then energized over the circuit hereinbefore described and the rotor 29 is caused to move upwardly and revolve so that the pinion 31 will engage and rotate the gear wheel 32. If the welding circuit is not reestablished within the time for which the time delay device 25 is adjusted, the operating arm 37 will engage the bridging member 42 and will remove it from engagement with the contact members 44 to open the energizing circuit to the operating windings 19 and 21 of the main switches 18 and 20, which will thereupon be opened. The motor 1 will then be disconnected from the power source and will stop. At the same time, the welding circuit will be disconnected from the welding generator 2, the field winding 28 will be deenergized and the time delay device 25 will be reset to the initial position.

It will be observed that it is desirable to disconnect the welding circuit from the welding generator 2 in order to permit the operator to initiate the closure of the main switches 18 and 20 by contacting the welding electrode 8 with the work 9. If the circuit to the generator 2 were not opened, the armature 3 and series field winding 4 would cause a short circuit across the welding circuit which would render ineffective the contacting of the welding electrode 8 with the work to effect the desired control function.

When it is desired to again perform the welding operation, the operator may again contact the work 9 with the welding electrode 8 and the foregoing cycle of operations will then be repeated.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

We claim as our invention:

1. The combination with a motor having driving connection with a generator for supplying current to a load circuit and means for opening and closing the load circuit, of control apparatus for automatically connecting and disconnecting the motor to and from a power source comprising switch means for connecting the motor to the power source and the generator to the load circuit, operating means for said switch means, normally closed contact means, circuit means for connecting said operating means to said power source through said normally closed contact means immediately on closure of the load circuit, thereby closing said switch means and time delay means operative from the power source for opening said normally closed contact means a predetermined interval of time after the load circuit is opened.

2. The combination with a motor having driving connection with a generator for supplying current to a load circuit and means for opening and closing the load circuit, of control apparatus for automatically connecting and disconnecting the motor to and from a power source comprising switch means for connecting the motor to the power source and the generator to the load circuit, operating means for said switch means, normally closed contact means, circuit means for connecting said operating means to said power source through said normally closed contact means on closure of the load circuit thereby closing said switch means, and a control motor disposed to be connected for energization to the power source on opening of the load circuit for opening said normally closed contact means a predetermined interval of time after opening of the load circuit.

3. The combination with a motor having driving connection with a generator for supplying current to a load circuit and means for opening and closing the load circuit, of control apparatus for automatically connecting and disconnecting the motor to and from a power source comprising switch means for connecting the motor to the power source and the generator to the load circuit, operating means for said switch means, normally closed contact means, circuit means for connecting said operating means to said power source through said normally closed contact means on closure of the load circuit thereby closing said switch means, time delay means for opening said normally closed contact means a predetermined interval of time after energization thereof, and a relay connected to be responsive to the flow of current in the load circuit for initiating the operation of said time delay means on cessation of flow of load current.

4. The combination with a motor having driving connection with a generator for supplying current to a load circuit and means for opening and closing the load circuit, of control apparatus for automatically connecting and disconnecting the motor to and from a power source comprising switch means for connecting the motor to the power source and the generator to the load circuit, operating means for said switch means, normally closed contact means, circuit means for connecting said operating means to said power source through said normally closed contact means on closure of the load circuit thereby closing said switch means, a control motor for opening said normally closed contact means a predetermined interval of time after energization thereof, and a relay connected to be responsive to the flow of current in the load circuit for effecting the energization of said control motor on cessation of flow of load current.

5. The combination with a motor having driving connection with a generator for supplying current to a load circuit, of control apparatus for automatically disconnecting the motor from a power source comprising a main switch for connecting the motor to the power source, an operating winding for said main switch, normally closed contact means, circuit means for connecting said operating winding to the power source through said normally closed contact means immediately upon closure of the load circuit, and time delay means for effecting the opening of said normally closed contact means a predetermined interval of time after cessation of flow of load current.

6. The combination with a motor having driving connection with a generator for supplying current to a load circuit, of control apparatus for automatically disconnecting the motor from a power source comprising a main switch for connecting the motor to the power source, an operating winding for said main switch, normally closed contact means, circuit means for connecting said operating winding to the power source through said normally closed contact means immediately upon completion of the load circuit, a control motor for opening said normally closed contact means a predetermined interval of time after energization thereof, and a relay connected to be responsive to the flow of current in the load circuit for effecting the energization of said control motor on cessation of flow of load current.

7. The combination with a motor having driving connection with a generator for supplying current to a load circuit and means for opening and closing the load circuit, of control apparatus for automatically connecting and disconnecting the motor to and from a power source comprising motor switch means for connecting the motor to the power source, generator switch means for connecting the generator to the load circuit, operating means individual to each switch means, normally closed contact means, circuit means for connecting the operating means individual to said motor switch means to said power source through said normally closed contact means on closure of the load circuit, and time delay means for opening said normally closed contact means a predetermined interval of time after the load circuit is opened.

8. The combination with a motor having driving connection with a generator for supplying current to a load circuit and means for opening and closing the load circuit, of control apparatus for automatically connecting and disconnecting the motor to and from a power source comprising motor switch means for connecting the motor to the power source, generator switch means for connecting the generator to the load circuit, operating means individual to each switch means, normally closed contact means, circuit means for connecting the operating means individual to said motor switch means to said power source through said normally closed contact means on closure of the load circuit, and a control motor disposed to be connected for energization to said power source on opening of the load circuit for opening said normally closed contact means a predetermined interval of time after opening of the load circuit.

9. The combination with a motor having driving connection with a generator for supplying current to a load circuit and means for opening and closing the load circuit, of control apparatus for automatically connecting and disconnecting the motor to and from a power source comprising motor switch means for connecting the motor to the power source, generator switch means for connecting the generator to the load circuit, operating means individual to each switch means, normally closed contact means, circuit means for connecting the operating means individual to said motor switch means to said power source through said normally closed contact means on closure of the load circuit, time delay means for opening said normally closed contact means a predetermined interval of time after the load circuit is opened, and relay means connected to be responsive to the flow of current in the load circuit for initiating the operation of said time delay means on cessation of flow of load current.

10. The combination with a motor having driving connection with a generator for supplying current to a load circuit and means for opening and closing the load circuit, of control apparatus for automatically connecting and disconnecting the motor to and from a power source comprising motor switch means for connecting the motor to the power source, generator switch means for connecting the generator to the load circuit, operating means individual to each switch means, normally closed contact means, circuit means for connecting the operating means individual to said motor switch means to said power source through said normally closed contact means on closure of the load circuit, a control motor for opening said normally closed contact means a predetermined interval of time after energization thereof, and a relay connected to be responsive to the flow of current in the load circuit for effecting the energization of said control motor on cessation of flow of load current.

11. A power supply system for changing electrical energy of one form to electrical energy of another form comprising a motor generator set, a primary source of electrical energy for driving the motor of said set, a switch for connecting and disconnecting the motor from said primary source, means for opening and closing the output circuit of the generator, means for automatically closing said switch responsive to the closure of the output circuit from the generator of said set, means responsive to the flow of current of a predetermined value from said generator for holding said switch closed, and means responsive to the cessation of the flow of current from said generator for a predetermined time for opening said switch.

12. The combination with a motor having driving connection with a generator for supplying current to a load circuit, of control apparatus for automatically connecting and disconnecting the motor to and from a power source comprising motor switch means for connecting the motor to the power source, generator switch means for connecting the generator to the load circuit, operating means individual to each switch means, normally closed contact means, circuit means for connecting the operating means individual to said motor switch means to said power source through said normally closed contact means on closure of the load circuit, and time delay means for opening said normally closed contact means a predetermined interval of time after the load circuit is opened.

JOHN H. BLANKENBUEHLER.
IRVINE J. REES.